United States Patent Office 3,428,729
Patented Feb. 18, 1969

3,428,729
CONTROLLED RELEASE FORMULATION
William R. Anderson, 593 W. 6th St., San Pedro, Calif. 90731; Anthony Pescetti, 1201 Paseo Del Mar, San Pedro, Calif. 90731; and William V. Dakin, 4911 Matilija, Sherman Oaks, Calif. 91403
No Drawing. Filed Dec. 20, 1966, Ser. No. 603,104
U.S. Cl. 424—19   4 Claims
Int Cl. A61k 9/00, 27/00

ABSTRACT OF THE DISCLOSURE

A unique formulation for controlled release of medication from subcutaneous implants in living animals wherein the presence of dibutylphthalate in a waxy medium and the temperature of the living animal are factors in accurately controlling the length of time of release of medication.

BRIEF SUMMARY OF THE INVENTION

Subcutaneous implants are being increasingly used in improving feed efficiency in cattle, sheep, pigs, fowl, etc. Short term (18 day) accurate, controlled release of proper hormones can control ovulation in cattle, sheep, etc., by implant for purpose of controlled breeding programs. This and related techniques are treated in the following prior art references:

(1) Pfizer, Technical Information Bulletin 105, "Stimplants for Improved Gains and Feed Efficiency in Cattle and Calves," Technical Information Service, Agricultural Division, Charles Pfizer & Co., New York, N.Y., 10017 (July 1965);
(2) Saunders (2,413,419) relating to the dispersion of a hormone substance within a waxy medium;
(3) Ehrlich (3,214,338) dealing with the application of a drug to the skin by means of a film-forming ointment whose principle is to cover and make an area airtight, thus allowing prolonged contact of medicine to the affected area. Dibutylphthalate is used as a plasticizer;
(4) Vaernet (2,517,513) relating to the use of a pharmacologically inert coating on medication;
(5) Hill (2,918,411) relating to the oral administration of a pharmaceutical preparation comprising a multiplicity of small pellets including polyvinylpyrrolidone for release up to 24 hours in the intestinal tract by oral ingestion; and
(6) Banker (3,097,144) dealing with the coating of tablets and employing polyvinylpyrrolidone.

None of these patents concern the controlled release of the desired medication over an extended period of time wherein the dispersion of the active ingredients is dependent upon heat of the animal's body and the presence of dibutylphthalate in a waxy medium. Practically speaking, these references, with the exception of the Pfizer document, concern time factors. Applicants' controlled release formulation, on the other hand, is directly responsive to the effect of the body temperature on a waxy medium containing DBP. Dibutylphthalate (DBP) is combined with beeswax and polyvinylpyrrolidone to release the active ingredients or medication in a controlled manner over a predetermined extended time period. Dibutylphthalate, as employed, is the key to slow the melting of the beeswax and polyvinylpyrrolidone. The slow controlled release avoids the undesired effects of common implant material; for example, "burn out" causing loss of weight, bulling, high tailing, premature bone closure, abnormal muscle development and the like. Progesterone may be employed as an active ingredient in a short acting (18 days) release to control ovulation of a herd, so that artificial insemination may be effectively scheduled. A successful controlled release vehicle dependent only on the effect of the body temperature on a special waxy medium and, independent of ambient temperature or other factors, would find wide application in the administration of pharmaceuticals by implant, to living animals.

DESCRIPTION OF THE PREFERRED EMBODIMENTS

The present controlled release medication involves a new approach to the release of medication from subcutaneous implants in living subjects. As such, it overcomes the conventional and uncontrolled effect in administration of medication by feeding or multiple injection. Oral feeding of hormones does not offer effective control and is expensive. The dependability of any controlled release implant medication is dependent upon the accuracy of release of a stated dosage of medication daily for a given number of days. The theory of action of the medication is based upon the effect of local body temperature of the living subject on the implanted chemical substance. The formulation of the implant will vary in percentages of the ingredients with the local body temperature of the living subject. The formula also varies in percentages and amounts with the number of days required to release the active medication, for example: diethylstilbestrol (DES) or progesterone. The formulation is varied from living subject to living subject, depending upon local body temperature and the desired length of time of release and may be varied in the range from 10 days to 180 days merely by changing the percentages and amounts of the ingredients in any of the below listed formulations.

(1) Timed for approximately 100 days:   Mg.
DES _____ 15.0
Beeswax _____ 1.0
Zinc stearate _____ 1.0
DBP _____ 0.1
PVP, q.s. ad. to granulate.

(2) Timed for approximately 120 days:
DES _____ 30.0
Beeswax _____ 1.5
Zinc stearate _____ 1.5
DBP _____ 0.5
PVP, q.s. ad. to granulate.

(3) Timed for approximately 100 days:
DES _____ 30.0
Beeswax _____ 1.0
Zinc stearate _____ 1.0
DBP _____ 0.5
PVP, q.s. ad. to granulate.

(4) Experimentation formula timed for 15 to 18 days:
DES-14c [1] _____ [2] 300.0
Beeswax _____ [2] 6.0
Zinc stearate _____ [2] 6.0
DBP _____ [2] 1.0
PVP 10% solution, q.s. to granulate.[2]

[1] 14c=0.1 microcurie per mg. of DES.
[2] 100 tablets or pellets.

Dibutylphthalate combined with the polyvinylpyrrolidone and beeswax gives a slow release. The zinc stearate is employed as a lubricant to aid in granulation and pelletizing of the medication. The radioactive ingredient 14c has been bound to DES in the experimental formula to determine the rate of absorption of DES from the laboratory animals maintained at various ambient temperatures.

Formulation is simple. As the temperature of the subject is determined together with the number of days desired for the release, the percentages of the ingredients are calculated. The beeswax and polyvinylpyrrolidone are melted and isopropyl alcohol added to solutionize. Then dibutylphthalate is added and the resultant warmed solution is added to the active ingredients to granulate the active ingredients. The granulation is then allowed to dry at room temperature for 24 to 48 hours under a ventilation hood. The resultant dried granules are then mixed with a measured amount of zinc stearate, after which the resultant mixture is made into a subcutaneous implant (tablet or pellet) in correct dosage form.

It is believed that dibutylphthalate, although used previously as a plasticizer, solvent, or insecticide, has not been described nor used as an effective ingredient to control release of active medication from a waxy medium in subcutaneous implants.

When progesterone is employed as the active ingredient by implant for controlled fertility experiments in breeding of cattle and sheep, the vaginal tampon is eliminated. This subcutaneous implant decreases the frequency of vaginal infection and is considerably more efficient and cheaper. Feed efficiency and ovulation control by oral feeding is uncontrolled and expensive. As an entire herd of sheep or cattle is treated with progesterone implants they would ovulate simultaneously and be receptive to artificial insemination at approximately the same time, thus saving great expense in roundups of cattle and sheep and offering a considerably more selective breeding program. Manifestly this unique vehicle could be used as a carrier for other hormones, steroids, vitamins, and medications applicable for implant. The present scope of work has been in the veterinary phase. Theoretically the same vehicle may be extended to the human medical phase.

Inasmuch as the controlled release is determined by body temperature of the living subject, absorption of the active ingredient can only be increased by increasing the temperature of the subject, for example as when the subject becomes ill with a fever. This would be relatively infrequent, therefore, minimizing variation in control.

It has been determined that a variation of 4° would cause only a 5% change in absorption. Prior products have recommended repeating 15 mg. doses in 90 days. Others recommend varied 12, 24 or 36 mg. in a single dose. Inventors' implants for fattening steers will contain 30 mg. of diethylstilbestrol that will release in 120 and 150 days in a steer whose body temperature is 101 degrees. The formulas should not change and may be used in all steers. A similar type pellet could be used for fattening sheep in which the dosage would vary from 3 to 6 mg. for 60 days at the body temperature of the sheep. The implant is placed in the ear of the animal, and, according to F.D.A. regulations, the ear must be removed 48 hours prior to slaughter. Since the chemical and pharmacological effect of DES is dissipated in this 48 hour period, the food supplied by the animals would be safe for human consumption.

In use of the composition wherein progesterone is the active ingredient, the herd would be implanted simultaneously for release during a period of 18 days. The release is to be complete so that the animals would enter oestrus simultaneously, enabling artificial insemination at the same time.

Manifestly, various types of active ingredients can be employed without departing from the spirit and scope of the invention, as defined in the claims.

Note must be made that DBP can be used in a like manner for controlled release of oral medications based upon the same principle of the effect of the heat of the body on a waxy medium containing DBP.

What is claimed is:

1. A pelletized controlled release medication for use in subcutaneous ear implants in living veterinary animal subjects calculated for approximately 100 day release comprising:
    (A) Diethylstilbestrol (DES), 15 milligrams;
    (B) Beeswax, 1.0 milligram;
    (C) Zinc stearate, 1.0 milligram;
    (D) Dibutylphthalate, 0.10 milligram; and
    (E) Polyvinylpyrrolidone (10% solution), q.s. to granulate.

2. A pelletized controlled release medication for use in subcutaneous ear implants in living veterinary animals calculated for approximately 120 day release, comprising:
    (A) Diethylstilbestrol (DES), 30 milligrams;
    (B) Beeswax, 1.5 milligrams;
    (C) Zinc stearate, 1.5 milligrams;
    (D) Dibutylphthalate, 0.5 milligram; and
    (E) Polyvinylpyrrolidone (10% solution), q.s. to granulate.

3. A controlled release medication for use in subcutaneous ear implants in living veterinary animals calculated for approximately 100 day release, comprising:
    (A) Diethylstilbestrol (DES), 30 milligrams;
    (B) Beeswax, 1.0 milligram;
    (C) Zinc stearate, 1.0 milligram;
    (D) Dibutylphthalate (DBP), 0.5 milligram; and
    (E) Polyvinylpyrrolidone (10% solution), q.s. to granulate.

4. A pelletized controlled release medication for use in subcutaneous implants for experimentation in laboratory animals calculated for manufacture of 100 tablets each having 15 to 18 day release, comprising:
    (A) 14c-DES, (diethylstilbestrol), in which there is 0.1 microcurie 14c per milligram of diethylstilbestrol, 300 milligrams;
    (B) Zinc stearate, 6 milligrams;
    (C) Beeswax, 6 milligrams;
    (D) Dibutylphthalate, 1.0 milligram; and
    (E) Polyvinylpyrrolidone, q.s. to granulate.

References Cited

UNITED STATES PATENTS 2,937,969    5/1960    Bruce           167—42 XR
3,018,217    1/1962    Bruce           167—42 XR LEWIS GOTTS, *Primary Examiner.*

S. K. ROSE, *Assistant Examiner.*

U.S. Cl. X.R.

424—346